(12) United States Patent　(10) Patent No.: US 8,040,021 B2
Blanchard et al.　(45) Date of Patent: Oct. 18, 2011

(54) DEVICE FOR THE ACTIVE DAMPING OF THE VIBRATIONS EXPERIENCED BY A FRAGILE PART OF MOVING EQUIPMENT, WITH AUTONOMOUS POWER SUPPLY

(75) Inventors: Laurent Blanchard, Mouans-Sartoux (FR); Jean Dupuis, Auribeau sur Siagne (FR)

(73) Assignee: Thales (FR)

( * ) Notice: Subject to any disclaimer, the term of this patent is extended or adjusted under 35 U.S.C. 154(b) by 475 days.

(21) Appl. No.: 12/159,932

(22) PCT Filed: Dec. 29, 2006

(86) PCT No.: PCT/FR2006/051440
§ 371 (c)(1),
(2), (4) Date: Jan. 27, 2009

(87) PCT Pub. No.: WO2007/077384
PCT Pub. Date: Jul. 12, 2007

(65) Prior Publication Data
US 2009/0218911 A1　Sep. 3, 2009

(30) Foreign Application Priority Data
Jan. 3, 2006　(FR) ...................................... 06 50015

(51) Int. Cl.
*H01L 41/08*　(2006.01)
(52) U.S. Cl. ........ 310/339; 181/206; 181/207; 181/208; 181/209; 381/71.1; 381/71.2; 381/71.7; 381/71.3; 381/71.5

(58) Field of Classification Search .................... 310/339
See application file for complete search history.

(56) References Cited

U.S. PATENT DOCUMENTS

| 5,734,246 A | 3/1998 | Falangas |
| 6,533,257 B1 | 3/2003 | Clark |
| 6,995,496 B1 * | 2/2006 | Hagood et al. ................ 310/339 |

FOREIGN PATENT DOCUMENTS

| EP | 1170524 A1 | 1/2002 |
| EP | 1422440 A1 | 5/2004 |
| FR | 2677415 A1 * | 12/1992 |

* cited by examiner

*Primary Examiner* — Jaydi San Martin
(74) *Attorney, Agent, or Firm* — Lowe Hauptman Ham & Berner, LLP

(57) ABSTRACT

A device for damping of vibrations for an item of equipment comprising a structure to which a first element and a second fragile element having to be protected from the vibrations are coupled. The device comprises first piezoelectric transducer means inserted between the structure and the first element and charged with converting energy of vibration of the structure into electric energy, at least one sensor coupled to the structure and arranged to deliver measurement signals representative of vibrations, control means electrically supplied by the electric energy generated and charged with deducing at least one amplitude of movement to compensate at least partially for the vibration, and to deliver control signals representative of each determined amplitude, and second piezoelectric transducer means inserted between the structure and the second element and charged with converting the control signals into movement to damp at least partially for the second element the vibrations.

20 Claims, 1 Drawing Sheet

DEVICE FOR THE ACTIVE DAMPING OF THE VIBRATIONS EXPERIENCED BY A FRAGILE PART OF MOVING EQUIPMENT, WITH AUTONOMOUS POWER SUPPLY

CROSS-REFERENCE TO RELATED APPLICATIONS

The present Application is based on International Application No. PCT/FR2006/051440, filed on Dec. 29, 2006, which in turn corresponds to French Application No. 0650015 filed on Jan. 3, 2006, and priority is hereby claimed under 35 USC§119 based on these applications. Each of these applications are hereby incorporated by reference in their entirety into the present application.

FIELD OF THE INVENTION

The invention relates to devices designed to damp the vibrations sustained by fragile elements within an item of equipment that vibrates during the transport phase preceding its use, such as for example a satellite in the launch phase.

BACKGROUND OF THE INVENTION

"Fragile element" in this instance means any physical element whose operation may be disrupted transiently or definitively by vibrations induced while the item of equipment of which it forms part is moved before being used. This could for example be a mirror of a space observation instrument, a module for measuring physical magnitude(s), a control module, an item of optical equipment, a plasma nozzle, a momentum wheel, a gyrometer or a gyroscope.

In certain fields, such as for example the space field, items of equipment are subjected at least transiently to more or less considerable movements and/or accelerations that cause their structure to vibrate and therefore certain elements that are coupled (or fixedly attached) thereto. This is notably the case with satellites that are placed in orbit by means of launchers or for certain items of equipment that are installed in the space shuttles.

When such an item of equipment comprises a fragile element, the latter must be "dimensioned" (or adapted) and/or coupled to damping devices, so as to withstand the load factors, if necessary during a launch phase.

This results in additional weight and/or space requirement, complexity and considerable development costs, and a possible deterioration of resolution in the case of elements using certain high-sensitivity mechanisms.

Furthermore, the damping device used is of the passive type, its effectiveness is limited, and when the damping device used is of the active type, it requires activation of an electric supply before the beginning of the mission, which is not usually allowed, notably in the space field.

Since no known damping device provides total satisfaction, the object of the invention is therefore to improve the situation.

For this purpose, it proposes a vibration-damping device for an item of equipment designed to be moved and comprising a structure to which at least a first element (deemed not to be fragile) and a second element that has to be protected from the vibrations because it is deemed fragile are coupled.

This vibration-damping device is characterized in that it comprises:

first piezoelectric transducer means inserted between the structure and the first element (and fixedly attached to the latter) and charged with converting the mechanical energy of vibration of the structure into electric energy, at least one sensor coupled to the structure and charged with delivering measurement signals representative of the vibrations sustained by the item of equipment, control means electrically supplied by the electric energy (delivered by the first transducer means) and charged with deducing from each measurement signal (delivered by a sensor) at least one amplitude of movement designed to compensate at least partially for the vibrations sustained by the structure, and to deliver control signals representative of each amplitude thus determined, and second piezoelectric transducer means inserted between the structure and the second element (and fixedly attached to the latter) and charged with converting the control signals into movement(s) in order to damp at least partially for the second element the vibrations sustained by its item of equipment.

Therefore, the damping device is of the active type while being self-sufficient with respect to its electric supply, due to the fact that it generates it.

The device according to the invention may comprise other features that may be taken separately or in combination and notably:

at least two sensors charged with delivering measurement signals representative of vibrations sustained by the structure in different directions, and second transducer means comprising at least two transducers charged with moving the second element in different directions;

each sensor may be charged with taking measurements of the accelerometric type;

its first transducer means may be made of a piezoelectric material chosen from piezoelectric monocrystals and piezoelectric ceramics;

its second transducer means and/or each sensor may be made of a piezoelectric material chosen from piezoelectric monocrystals and piezoelectric ceramics;

its second transducer means and/or each sensor may be constituted of at least one stack of at least one layer of the piezoelectric material.

each transducer (of the second transducer means) and the corresponding sensor may if necessary constitute together two complementary portions of one and the same stack of layers of said piezoelectric material.

when the item of equipment (or the second element) comprises means designed to mechanically damp the second element, and known damping capacities, the control means may be charged with deducing each amplitude of movement of each measurement signal taking account of the damping capacities;

its control means may be arranged so as to be activated and deactivated at chosen moments.

The invention also proposes an item of equipment furnished with a vibration-damping device of the type explained above.

The invention is particularly well suited, although in a nonexclusive manner, to the space field and to the transport field, notably the rail transport field.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

The appended drawings can not only serve to supplement the invention, but also contribute to its definition, if need be.

The object of the invention is to allow at least the partial damping of a fragile element from the vibrations sustained by a moving item of equipment of which it forms part.

In the following, it is considered as a nonlimiting example that the item of equipment is an observation instrument fixedly attached at least partially to at least one satellite having to be placed in orbit by a rocket in order to fulfill a mission of space observation of the earth or a portion of the universe, from space.

But the invention is not limited to this type of equipment. Specifically it relates to any item of equipment, for space or otherwise, sustaining vibrations when it is moved and comprising a structure to which at least a first element considered not fragile and a second fragile element having to be protected from these vibrations are fixedly attached (or coupled). It may therefore involve, for example, a satellite, a land transport vehicle, such as for example an automobile or a truck or else an aircraft.

DETAILED DESCRIPTION OF THE INVENTION

Figure 1:
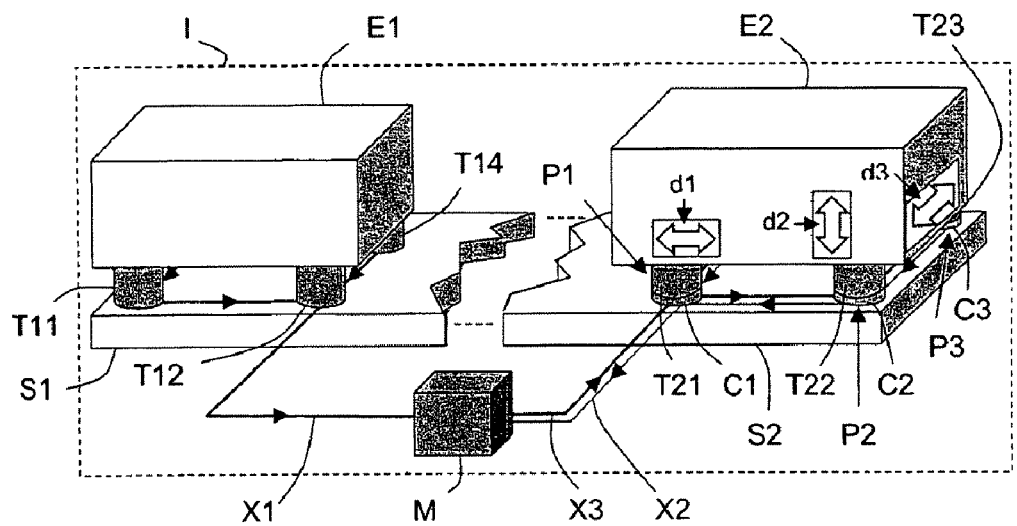
FIG. 1 illustrates in a very schematic and functional manner an item of equipment comprising first and second elements and an exemplary embodiment of a device for damping the second element according to the invention.

As illustrated in FIG. 1, the instrument (or item of equipment) I comprises a structure S1, S2 comprising a first portion S1 to which a first element E1 deemed not fragile, such as for example an electronic module, and a second portion S2 to which a second element E2 deemed fragile, such as for example a mirror, momentum wheels and other measurement instruments or an item of "optical equipment" are fixedly attached (or coupled).

The invention proposes a device designed to damp for the second element E2 the vibrations sustained by the structure S1, S2 of the item of equipment I (and therefore by the latter). This device comprises at least first piezoelectric transducer means T1$i$, at least one sensor Cj, a control module MC, and second piezoelectric transducer means T2$k$.

The first piezoelectric transducer means T1$i$ are inserted between the first portion S1 of the structure and the first element E1 while being fixedly attached thereto. They are charged with converting the mechanical energy of vibration of the structure into electric energy.

The first transducer means T1$i$ are for example made of a piezoelectric material such as piezoelectric monocrystals. They could equally be made with piezoelectric ceramics. In a general manner, any type of piezoelectric material may be used provided that it makes it possible to convert an energy that is sufficiently great to electrically supply the control module MC and allow it to function.

For example, and as illustrated in FIG. 1, the first transducer means T1$i$ take the form of four short, identical mounts T11 to T14 (i=1 to 4). FIG. 1 shows only the mounts T11 to T13 because of the perspective. Their number is not limited to four. Any value greater than or equal to one (1) may be envisaged. Furthermore, each mount T1$i$ may if necessary be constituted of a stack of layers of piezoelectric material in order to reduce the voltage (high voltages may specifically be the cause of problems such as burnout).

Thanks to the use of a piezoelectric material, the first transducer means T1$i$ constitute a first compact and light electromechanical interface which constitutes a generator of electric current without affecting the weight of the equipment I. The electric energy resulting from the conversion of the mechanical energy of vibration is therefore in this instance, as an example, a microcurrent at (fairly) high electric voltage.

The current generated by the first transducer means T1$i$ is collected by an electric conductor (for example a cable) X1 which is connected to the control module MC.

Each sensor Cj is coupled (fixedly attached) to the second portion S2 of the structure and is charged with delivering measurement signals which represent vibrations sustained by said structure in a chosen direction dj. The number of sensors Cj is at least equal to one (1). But, it is preferable that the number of sensors Cj is at least equal to two (j=1 to 2), and preferably equal to three (j'1 to 3), as illustrated in FIG. 1. In the presence of three sensors C1 to C3, it is therefore possible to measure the vibrations sustained by the second portion S2 of the structure in three different directions d1 to d3, perpendicular to one another.

Preferably, each sensor Cj is arranged so as to take measurements of the accelerometric type in the direction dj, in order to deliver signals representative of its accelerometric measurements. But, it is possible to use other types of sensors, such as for example sensors intended to measure forces at the interfaces (in this case, the compensation tends to oppose the measured forces).

Each sensor Cj is for example made of a piezoelectric material such as piezoelectric monocrystals. It could equally be made with piezoelectric ceramics. Generally, any type of piezoelectric material may be used provided that it makes it possible to generate a measurement signal in the form of a current sufficiently great to be analyzable by the control module MC.

For example, and as illustrated in FIG. 1, each sensor Cj takes the form of a first portion of a short mount Pk, to which the description will return below and whose second matching portion is constituted by a transducer (or actuator) T2$k$ of the second transducer means. But each sensor Cj may be placed beside the transducer T2$k$ that is associated with it. Each mount forming a sensor Cj may if necessary be constituted of a stack (or of a portion of a stack) of at least one layer of piezoelectric material, for example of two to five layers. Specifically, two situations can be envisaged. If the sensors Cj are accelerometers placed on the element E2 so as to measure its accelerations and the actuators are placed under the element E2, only one layer may suffice. If the piezoelectric actuators (transducers) T2$k$ also fulfill the function of a sensor, it is possible to provide multilayered stacks. Specifically, the piezoelectric actuators (transducers) T2$k$ being constituted of a stack of layers separated by electrodes (in order to lower the control voltage), a few layers (typically two to five) may be used not as actuators but as sensors $C_j$ which generate an electric voltage under the effect of a force.

The measurement signals (current) generated by the sensors $C_j$ are collected by an electric conductor (for example a cable) X2 which is connected to the control module MCC.

As indicated above, the electric current, necessary to the control module MC for analyzing the measurement signals delivered by the sensor(s) $C_j$, is the result of the conversion of the vibration energy of the first portion S1 of the structure into current, carried out by the first transducer means T1$i$.

This control module MC is charged with deducing from each measurement signal that it receives via the electric conductor X2 at least one amplitude of movement designed to compensate at least partially, for the second element E2, for the vibrations sustained by the structure (at its second portion S2). In the presence of several sensors $C_j$, three for example, the control module MC receives three measurement signals representative respectively of the vibrations in the three directions d1 to d3. It may therefore deduce therefrom the three amplitudes of movement that the second element E2 will have to undergo, in said three directions D1 to D3, in order to virtually totally or partially damp said vibrations.

The control module MC converts each amplitude of movement that it has deduced into a control signal (current) intended for the second transducer means (or actuators) T2$k$.

Figure 2:
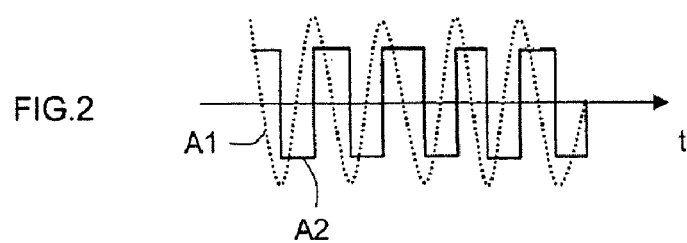
FIG. 2 is a diagram illustrating an example of a time (t) evolution curve of a measurement signal corresponding to a chosen direction, and an example of a time evolution curve of the control signals representative of the amplitude of movement to be applied to the second element in the chosen direction taking account of the time evolution curve of the vibrations.

FIG. 2 shows a diagram which illustrates, on the one hand, an example of a curve A1 of time (t) evolution of the measurement signal delivered by a sensor $C_j$, for example C1, and representative of the vibrations in a direction $d_j$, for example d1, and, on the other hand, an example of a curve A2 of time evolution of the control signal, delivered by the control module MC and representative of the amplitude of movement to be applied to the second element E2 (in this instance in the direction d1) taking account of the curve A1.

In order to control the piezoelectric actuators (transducers) T2$k$, it is possible to use any technique known to those skilled in the art, and notably those described in patent documents EP 0676558 and EP 1132647.

It is important to note that the item of equipment I, or the second element E2, may be provided with additional means (not shown) designed to mechanically damp said second element E2 and with known damping capacities. Such damping means may for example take the form of elastic strips fixedly attached to the second portion S2 of the structure and to the second item of equipment E2 in chosen locations. In this case, the control module MC is arranged to deduce each amplitude of movement of each measurement signal, taking account of the damping capacities of the additional damping means, so that the total movement of the second element E2 effectively (or at least partially) compensates for the total movement induced by the vibrations.

The control signals (current) generated by the control module MC are collected by an electric conductor (for example a cable) X3 which is connected to the second transducer means T2$k$.

These second transducer means T2$k$ are inserted between the second portion S2 of the structure and the second element E2, while being fixedly attached to them. They are charged with converting the current(s) (command signals), delivered by the control module MC, into movement(s) in order to damp at least partially, for the second element E2, the vibrations sustained by its equipment I (and more precisely the second portion S2 of the structure).

These second transducer means T2$k$ are for example made of a piezoelectric material such as piezoelectric monocrystals. They could equally be made with piezoelectric ceramics. Generally, any type of piezoelectric material may be used provided that it makes it possible to generate a movement sufficiently great to compensate for the effect of the vibrations in a given direction $d_j$.

Piezoelectric monocrystals are particularly worthwhile because they have a great lengthening capacity, typically 2% (which is approximately ten times more than the lengthening provided by piezoelectric ceramics). This makes it possible to produce very compact active interfaces.

For example, and as illustrated in FIG. 1, the second transducer means T2$k$ take the form of three portions T21 to T23 (k=1 to 3) of mounts Pk that are identical and short. More precisely, in the example illustrated, three mounts P1 to P3 are inserted between the second portion S2 of the structure and the second element E2, each mount Pk being constituted of a first portion defining a sensor Pj (where j=k) and a second matching portion defining a transducer T2$k$. These mounts Pk may for example be cylindrical in shape with circular section (as illustrated).

Specifically, each sensor $C_j$ is preferably associated with a transducer (actuator) T2$k$ (k=j). But it is not obligatory for a sensor $C_j$ to form part of the same mount Pk as the transducer T2$k$ that is associated with it. They may be placed one beside the other. In this case, each transducer T2$k$ constitutes a mount Pk that is fixedly attached to the second portion S2 of the structure and to the second element E2, while each sensor Pj is fixedly attached only to the second portion S2 of the structure.

The mounts Pk may for example be cylindrical in shape with circular section (as illustrated).

Furthermore, each transducer T2$k$ may if necessary be constituted of a stack of at least one layer of piezoelectric material. In this case, the number of layers depends mainly on the amplitude of the vibrations to be corrected and on the possible control voltage.

When a sensor $C_j$ and a transducer T2$k$ constitute the two complementary portions of one and the same mount Pk, they form a single stack.

It is important to note that the damping device may comprise only one sensor $C_j$ and one associated transducer T2$k$, or else two sensors $C_j$ and two associated transducers T2$k$, and not three sensors $C_j$ and three associated transducers T2$k$, as illustrated in FIG. 1.

Thanks to the use of a piezoelectric material, the second transducer means T2$k$ constitute a second compact and light electromechanical interface that constitutes a generator of k-dimensional micromovement(s) without affecting the weight of the item of equipment I.

It is important to note that the control module MC may if necessary be activated and deactivated at chosen moments. More precisely, the vibration-damping device according to the invention being designed to operate when the item of equipment I is subjected to (great) vibrations, it is preferable for its control module MC to be activated slightly before the vibrations begin and that it is deactivated when the vibrations end. For example, in the case of a launch by means of a rocket, the control module MC may be authorized to operate between the moment when the item of equipment I is placed in the rocket and the moment when the item of equipment I reaches orbit in the location planned for its mission (or else just before its second element E2 begins to be deployed, if that is planned).

The device is advantageously self-sufficient and requires no external activation. Specifically it is activated automatically as soon as the vibration level generates a sufficient electric supply energy (for example a voltage), which corresponds to the design with loads smaller than those that the sensitive item of equipment can sustain without compensation.

The invention is not limited to the embodiments of a vibration-damping device and of equipment described above, merely as an example, but it covers all the variants that those skilled in the art might envisage in the context of the following claims.

Therefore, the invention applies to the situations in which one, two or three translations, and/or one, two or three rotations are present or else to the control of microvibrations.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A vibration-damping device for an item of equipment that has to be moved comprising:
    a structure;
    a first element and a second fragile element to be protected from vibrations, the first element and the second fragile element coupled to said structure;
    a first piezoelectric transducer means inserted between said structure and said first element and arranged to convert mechanical energy of vibration of the structure into electric energy,
    at least one sensor coupled to the structure and arranged to deliver measurement signals representative of vibrations sustained by said item of equipment,
    a control means electrically powered by said electric energy and arranged to deduce from each measurement signal at least one amplitude of movement designed to compensate at least partially for said vibrations sustained by the structure, and to deliver control signals representative of the at least one amplitude, and
    a second piezoelectric transducer means inserted between said structure and said second fragile element and arranged to convert said control signals into movement so as to damp at least partially for the second fragile element, the vibrations sustained by said item of equipment.

2. The device as claimed in claim 1, comprising at least two sensors arranged to deliver measurement signals representative of vibrations sustained by said structure in different directions, and in that said second piezoelectric transducer means comprise at least two transducers arranged to move said second fragile element in different directions.

3. The device as claimed in claim 2, wherein said second piezoelectric transducer means and/or the at least one sensor are constituted of at least one stack of at least one layer of a piezoelectric material.

4. The device as claimed in claim 2, wherein said first piezoelectric transducer means are made of a piezoelectric material chosen from a group comprising at least piezoelectric monocrystals and piezoelectric ceramics.

5. The device as claimed in claim 2, wherein said second piezoelectric transducer means and/or the at least one sensor are made of a piezoelectric material chosen from a group comprising at least piezoelectric monocrystals and piezoelectric ceramics.

6. The device as claimed in claim 2, wherein each transducer of said second piezoelectric transducer means and the corresponding sensor constitute together two complementary portions of one and the same stack of layers of a piezoelectric material.

7. The device as claimed in claim 1, wherein the at least one sensor is arranged to take measurements of an accelerometric type.

8. The device as claimed in claim 7, wherein said second piezoelectric transducer means and/or the at least one sensor are made of a piezoelectric material chosen from a group comprising at least piezoelectric monocrystals and piezoelectric ceramics.

9. The device as claimed in claim 7, wherein each transducer of said second piezoelectric transducer means and the corresponding sensor constitute together two complementary portions of one and the same stack of layers of a piezoelectric material.

10. The device as claimed in claim 1, wherein said first piezoelectric transducer means is made of a piezoelectric material chosen from a group comprising at least piezoelectric monocrystals and piezoelectric ceramics.

11. The device as claimed in claim 10, wherein said second piezoelectric transducer means and/or the at least one sensor are made of a piezoelectric material chosen from a group comprising at least piezoelectric monocrystals and piezoelectric ceramics.

12. The device as claimed in claim 10, wherein each transducer of said second piezoelectric transducer means and the corresponding sensor constitute together two complementary portions of one and the same stack of layers of said piezoelectric material.

13. The device as claimed in claim 1, wherein said second piezoelectric transducer means and/or the at least one sensor are made of a piezoelectric material chosen from a group comprising at least piezoelectric monocrystals and piezoelectric ceramics.

14. The device as claimed in claim 13, wherein said second piezoelectric transducer means and/or the at least one sensor are constituted of at least one stack of at least one layer of said piezoelectric material.

15. The device as claimed in claim 13, wherein each transducer of said second piezoelectric transducer means and the corresponding sensor constitute together two complementary portions of one and the same stack of layers of said piezoelectric material.

16. The device as claimed in claim 1, wherein each transducer of said second piezoelectric transducer means and the corresponding sensor constitute together two complementary portions of one and the same stack of layers of said piezoelectric material.

17. The device as claimed in claim 1, wherein, in the presence of means for mechanical damping of the second fragile element, with known damping capacities, said control means are arranged in order to deduce each amplitude of movement from each measurement signal, taking account of said damping capacities.

18. The device as claimed in claim 1, wherein said control means are arranged in order to be activated and deactivated at chosen moments.

19. An item of equipment comprising at least one vibration-damping device as claimed in claim 1.

20. A device adapted to be used in space comprising the vibration-damping device and the item of equipment as claimed in claim 1.

* * * * *